United States Patent
Ljung et al.

(10) Patent No.: US 11,757,970 B2
(45) Date of Patent: *Sep. 12, 2023

(54) SYSTEM AND METHOD FOR CONTENT STREAMING IN A NETWORK ENVIRONMENT

(71) Applicant: Sony Mobile Communications Inc., Tokyo (JP)

(72) Inventors: Rickard Ljung, Helsingborg (SE); Samir Drincic, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/797,236

(22) Filed: Oct. 30, 2017

(65) Prior Publication Data
US 2018/0063219 A1    Mar. 1, 2018

Related U.S. Application Data

(63) Continuation of application No. 14/435,349, filed on Apr. 13, 2015, now Pat. No. 9,832,251.

(51) Int. Cl.
*G06F 13/00*    (2006.01)
*H04L 65/80*    (2022.01)
(Continued)

(52) U.S. Cl.
CPC ............ *H04L 65/80* (2013.01); *H04L 47/127* (2013.01); *H04L 65/613* (2022.05); *H04L 67/75* (2022.05); *H04L 69/24* (2013.01); *H04N 21/23805* (2013.01); *H04N 21/41407* (2013.01); *H04N 21/4621* (2013.01); *H04N 21/64738* (2013.01);
(Continued)

(58) Field of Classification Search
CPC ..... H04L 47/127; H04L 65/80; H04L 65/604; H04L 67/36; H04L 69/24; H04L 67/02; H04L 65/4084; H04L 47/19; H04L 65/613; H04L 67/75; H04L 65/612; H04L 65/764; H04L 65/752; H04N 21/23805;
(Continued)

(56) References Cited

U.S. PATENT DOCUMENTS

| | | | |
|---|---|---|---|
| 8,788,699 B2 * | 7/2014 | Kitagata | G06Q 10/10 709/217 |
| 8,812,621 B2 * | 8/2014 | Begen | H04L 65/1069 709/219 |

(Continued)

FOREIGN PATENT DOCUMENTS

WO    2011047335 A1    4/2011

OTHER PUBLICATIONS

International Search Report and Written Opinion dated Jan. 14, 2015 for corresponding International Application No. PCT/IB2014/061214.

*Primary Examiner* — Kenneth R Coulter
(74) *Attorney, Agent, or Firm* — Renner, Otto, Boisselle & Sklar, LLP

(57) ABSTRACT

Streaming content with an electronic device includes incrementally downloading content data at a first quality level from a content server over a network. Triggered by receipt of a notification indicative of predicted network congestion, the electronic device requests and downloads a next increment of the content data at a second quality level lower than the first quality level from the content server.

12 Claims, 3 Drawing Sheets

(51) Int. Cl.
   *H04N 21/238*    (2011.01)
   *H04N 21/647*    (2011.01)
   *H04L 47/127*    (2022.01)
   *H04L 69/24*     (2022.01)
   *H04N 21/462*    (2011.01)
   *H04N 21/414*    (2011.01)
   *H04L 65/613*    (2022.01)
   *H04L 67/75*     (2022.01)
   *H04W 28/02*     (2009.01)
   *H04L 67/02*     (2022.01)
   *H04L 47/19*     (2022.01)
   *H04L 65/612*    (2022.01)
   *H04L 65/75*     (2022.01)

(52) U.S. Cl.
   CPC ............ *H04L 47/19* (2013.01); *H04L 65/612* (2022.05); *H04L 65/764* (2022.05); *H04L 67/02* (2013.01); *H04W 28/02* (2013.01)

(58) Field of Classification Search
   CPC ....... H04N 21/64738; H04N 21/41407; H04N 21/4621; H04W 28/02; H04W 28/0289
   USPC ......... 709/232, 231, 224, 233–235, 217–219
   See application file for complete search history.

(56) References Cited

U.S. PATENT DOCUMENTS

| | | | |
|---|---|---|---|
| 8,837,443 B2 | 9/2014 | Yamada et al. | |
| 8,854,958 B2 * | 10/2014 | Gell | H04N 21/23439 370/229 |
| 9,015,068 B1 * | 4/2015 | Bertz | G06Q 30/0253 705/26.8 |
| 9,219,689 B2 * | 12/2015 | Crisan | H04L 49/25 |
| 9,219,691 B2 * | 12/2015 | Crisan | H04L 43/04 |
| 9,253,231 B2 * | 2/2016 | O'Callaghan | H04L 65/605 |
| 9,596,670 B2 * | 3/2017 | Rao | H04W 64/006 |
| 9,692,800 B2 * | 6/2017 | Gaunt | H04L 65/4084 |
| 9,787,540 B2 * | 10/2017 | Landscheidt | H04L 41/0681 |
| 9,832,251 B2 * | 11/2017 | Ljung | H04L 65/80 |
| 9,936,416 B2 * | 4/2018 | Li | H04L 65/612 |
| 10,044,817 B2 * | 8/2018 | Vuyyuru | H04W 4/50 |
| 10,069,884 B2 * | 9/2018 | Gaunt | H04N 21/4825 |
| 2010/0312905 A1 * | 12/2010 | Sandmann | H04L 65/602 709/231 |
| 2011/0238859 A1 * | 9/2011 | Kitagata | G06Q 10/10 709/232 |
| 2012/0284371 A1 * | 11/2012 | Begen | H04L 65/1069 709/219 |
| 2013/0163430 A1 * | 6/2013 | Gell | H04N 21/23439 370/235 |
| 2013/0286879 A1 | 10/2013 | ElArabawy et al. | |
| 2013/0297743 A1 * | 11/2013 | Eschet | H04L 65/60 709/219 |
| 2014/0071814 A1 * | 3/2014 | Landscheidt | H04L 41/0816 370/229 |
| 2014/0200038 A1 * | 7/2014 | Rao | G01C 21/32 455/457 |
| 2014/0281020 A1 * | 9/2014 | Crisan | H04L 43/02 709/235 |
| 2014/0348116 A1 | 11/2014 | Yamada et al. | |
| 2015/0016252 A1 * | 1/2015 | Crisan | H04L 47/122 370/230 |
| 2015/0026309 A1 * | 1/2015 | Radcliffe | H04L 65/602 709/219 |
| 2015/0163809 A1 * | 6/2015 | Inaida | H04W 72/0486 370/230 |
| 2015/0180924 A1 * | 6/2015 | O'Callaghan | H04L 65/605 709/219 |
| 2015/0180995 A1 * | 6/2015 | Hofmann | H04L 67/2814 709/213 |
| 2015/0189539 A1 * | 7/2015 | Li | H04W 28/0268 370/230 |
| 2015/0365450 A1 * | 12/2015 | Gaunt | H04L 65/4084 709/231 |
| 2016/0021190 A1 * | 1/2016 | Vuyyuru | H04W 4/022 709/223 |
| 2017/0257408 A1 * | 9/2017 | Gaunt | H04L 65/4084 |
| 2020/0099652 A1 * | 3/2020 | Ljung | H04L 67/147 |

\* cited by examiner

SYSTEM AND METHOD FOR CONTENT STREAMING IN A NETWORK ENVIRONMENT

RELATED APPLICATION DATA

This application is a continuation of U.S. application Ser. No. 14/435,349 (U.S. Pat. No. 9,832,251) filed on Apr. 13, 2015.

TECHNICAL FIELD OF THE INVENTION

The technology of the present disclosure relates generally to delivering streaming content to electronic devices and, more particularly, to an approach for streaming content to an electronic device in coordination with network conditions.

BACKGROUND

Mobile electronic devices, such as a mobile phones and tablet computers, are capable of performing a wide variety of functions. One function is the streaming content—often over a cellular interface or a packet-switched interface—for the consumption of the content by the user of the electronic device. A typical type of content that is streamed is video content, which may be displayed on the display of the electronic device while corresponding audio is output via a speaker, earbuds, or a headset.

Streaming content to electronic devices is conventionally carried out in a relatively non-intelligent manner. For instance, in one conventional technique, the electronic device selects delivery attributes depending on historical bit rates. In this technique the device requests content at, for example, a certain bitrate and/or quality of stream. The quality of a stream is sometimes referred to by the format of the content or the corresponding codec used in the playback of the content (e.g., video formats include 1080p, 720p, 480p, etc.).

The device continues to request content with the selected delivery attributes until historical statistics for data rate reception indicate that a change should be made (e.g., poor data rate reception indicates that a lower quality stream should be requested and good data rate reception indicates that a higher quality stream should be requested). In this approach, if the network becomes congested, there is typically a period of time during which data cannot be delivered to support the requested delivery attributes. The device may react to the change in network performance by requesting a lower quality data stream, but not before the device's buffer becomes depleted and the consumption of the content is interrupted or becomes laggy in behavior.

SUMMARY

The disclosed techniques leverages information known to a network to predict changes in network congestion and to alert an electronic device that is engaging in streaming content to the predicted changes in network congestion. The electronic device may change selected delivery attributes of the streamed content before network performance cannot support a current set of delivery attributes. In this manner, more seamless consumption of streaming content may result. As network conditions improve, the electronic device may be alerted and a return to the consumption of higher quality content may be initiated.

According to one aspect of the disclosure, a method of streaming content with an electronic device includes incrementally downloading content data at a first quality level from a content server over a network; receiving a notification indicative of predicted network congestion; and requesting and downloading a next increment of the content data from the content server, a timing of the requesting and downloading the next increment triggered by the receipt of the notification.

According to one embodiment of the method, receiving the notification includes a paging event from the network.

According to one embodiment of the method, the incremental downloading includes periods during which content data is downloaded interleaved with periods during which content data is not downloaded.

According to one embodiment of the method, the requesting the next increment of the content is performed as a pre-fetch of content data before a next download increment at the first quality level would have started absent receipt of the notification.

According to one embodiment of the method, the requesting and downloading the next increment of content data is at a second quality level lower than the first quality level.

According to one embodiment, the method further includes receiving another notification indicative of additional predicted network congestion; and requesting and downloading a next increment of the content data at a third quality level lower than the second quality level from the content server, the requesting and downloading the next increment of the content data at the third quality level triggered by the receipt of the additional notification.

According to one embodiment, the method further includes receiving a notification indicative of network improvement or predicted network improvement; and requesting and downloading a next increment of the content data at the first quality, the requesting and downloading of the next increment of the content data at the first quality level triggered by the receipt of the notification of network improvement or predicted network improvement.

According to another aspect of the disclosure, an electronic device configured to stream content from a content server over a network includes a communications circuit over which communications with the content server are made via a network; a media buffer; and a control circuit. The control circuit, in conjunction with the communications circuit, incrementally downloads content data at a first quality level from the content server to the media buffer; receives a notification indicative of predicted network congestion; and requests and downloads a next increment of the content data from the content server, a timing of the request for and download of the next increment triggered by the receipt of the notification.

According to one embodiment of the electronic device, receipt of the notification comprises receipt of a paging event from the network.

According to one embodiment of the electronic device, the incremental download of content data includes periods during which content data is downloaded interleaved with periods during which content data is not downloaded.

According to one embodiment of the electronic device, the request for the next increment of the content data is performed as a pre-fetch of content data before a next download increment at the first quality level would have started absent receipt of the notification.

According to one embodiment of the electronic device, the request and download of the next increment of content data is at a second quality level lower than the first quality level.

According to one embodiment of the electronic device, the control circuit further receives another notification indicative of additional predicted network congestion; and requests and downloads a next increment of the content data at a third quality level lower than the second quality level from the content server, the request for and download of the next increment of content data at the third quality level triggered by the receipt of the additional notification.

According to one embodiment of the electronic device, the control circuit further receives a notification indicative of network improvement or predicted network improvement; and requests and downloads a next increment of the content data at the first quality, the request for and download of the next increment of content data at the first quality level triggered by the receipt of the notification of network improvement or predicted network improvement.

According to another aspect of the disclosure, a method of regulating an electronic device during the streaming of content from a content server over a network includes detecting that the electronic device is streaming content data; monitoring network conditions affecting the streaming of content data by the electronic device; predicting that the network conditions will degrade; and notifying the electronic device of the prediction of degraded network conditions.

According to one embodiment, the method further includes predicting that the network conditions will improve from the degraded state; and notifying the electronic device of the prediction of improved network conditions or of improved network conditions.

According to one embodiment of the method, the notifying comprises transmitting a paging request to the electronic device.

DETAILED DESCRIPTION OF EMBODIMENTS

Figure 1:
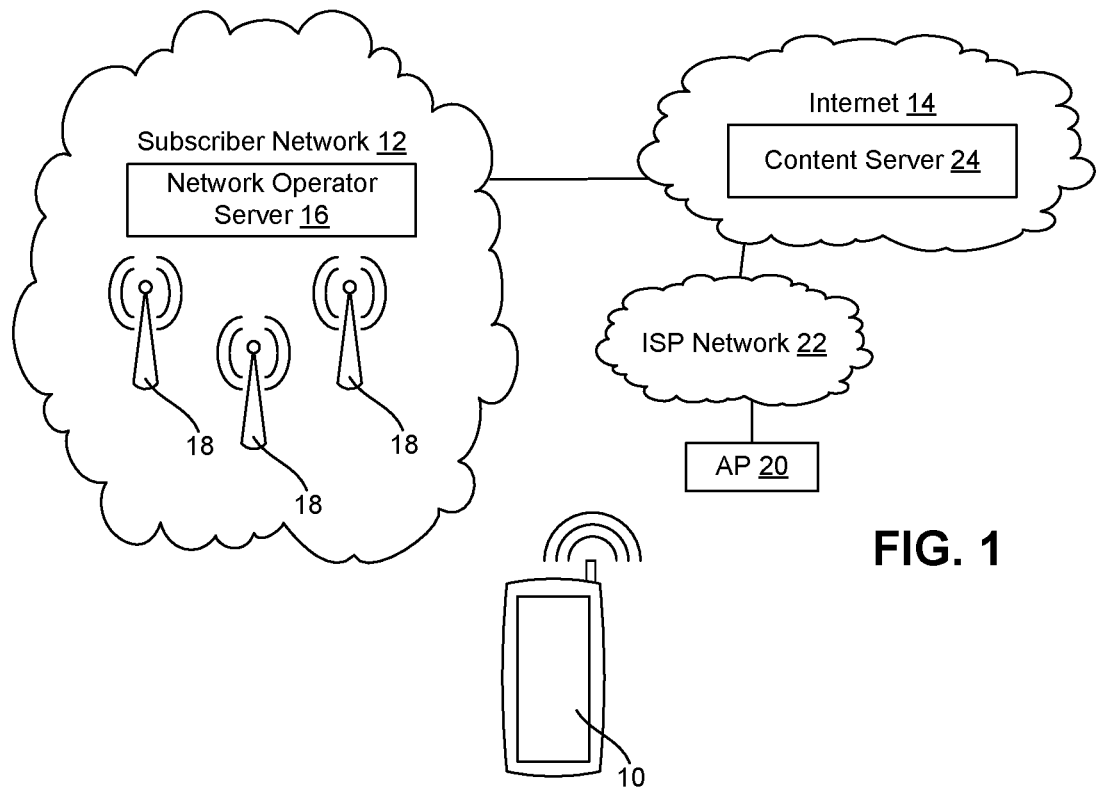
FIG. 1 is a schematic view of a communication environment for an electronic device.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below in conjunction with the appended figures are various embodiments of delivering content to an electronic device. The electronic device is typically—but not necessarily—a mobile electronic device, and may take any form factor including, but not limited to, a mobile telephone, a tablet computing device, a laptop computer, a gaming device, a camera, or a media player. The electronic device shown in the appended figures is a mobile telephone, but applicability of aspects of the invention is not limited to mobile telephones.

With initial reference to FIG. 1, schematically illustrated is an exemplary network environment in which an electronic device 10 operates. In the network environment, the electronic device 10 may carry out wireless communications. To conduct wireless communications, the electronic device 10 establishes network connectivity with one or more networks. Typically, the connection is made to a subscriber network 12 that services the physical geo-location of the electronic device 10. The subscriber network 12 also may be referred to as a radio access network. The network 12 may provide the electronic device 10 with access to the Internet 14. In most cases, the network 12 is a cellular network operated by a respective cellular service telephone company. Exemplary network access technologies for the network 12 are typically cellular circuit-switched network technologies and include, but are not limited to, global system for mobile communications (GSM), code division multiple access (CDMA), wideband CDMA (WCDMA), and advanced or alternative versions of these standards. The networks may support general packet radio service (GPRS), universal mobile telecommunications system (UMTS), 3G, 4G long-term evolution (LTE), or other standards.

The network 12 supports communications such as, but not limited to, voice communications (e.g., telephone calls), video communications (e.g., video telephony), messaging (e.g., instant messaging, text and multimedia messaging, and electronic mail messaging), data transfers, and Internet browsing. Data transfers may include, but are not limited to, the streaming of content such as video or other relatively large data files.

To support the communications activity of the electronic device 10, the network 12 may include a network operator server 16 (or servers). The server 16 may be configured as a typical computer system used to carry out server functions and may include a processor configured to execute software containing logical instructions that embody the functions of the server 16 and a memory to store such software and related data.

The communications between the electronic device 10 and the subscriber network 12 may be established by way of a transmission medium of the subscriber network 12. The transmission medium may be any appropriate device or assembly, but is typically an arrangement of communications base stations 18 (e.g., cellular service towers, also referred to as "cell" towers).

In some situations, the electronic device 10 may communicate with the Internet 14 via an access point 20 of a local area network (LAN) using a packet-switched protocol, such as IEEE 802.11a, IEEE 802.11b, IEEE 802.11g or IEEE 802.11n (commonly referred to as WiFi). Other LAN-based protocols are possible, such as WiMax under IEEE 802.16. The access point 20 is typically, but not necessarily, a wireless router that interfaces via a modem with an Internet service provider (ISP) that operates an ISP network 22 to establish Internet connectivity.

Accessible to the electronic device 10 via the Internet 14 may be a content server 24 that stores data that is streamed to the electronic device 10. For this purpose, and to carry out other functions of the content server 24, the content server 24 may be configured as a typical computer system used to carry out server functions. Therefore, the content server 24 may include a processor configured to execute software containing logical instructions that embody the functions of the content server 24 and a memory to store such software and related data.

In one operational situation, data that is streamed by the electronic device 10 is stored by the content sever 24 and streamed via the subscriber network 12 (e.g., over a cellular data connection). In this situation, the subscriber network 12 monitors conditions in the subscriber network 12 for events that are predicted to affect the performance of the streaming operation and alerts the electronic device 10 to a potential change in performance. In another operational situation, the data that is streamed by the electronic device 10 is stored by the content sever 24 and streamed via the ISP network 22. In this situation, the ISP network 22 monitors conditions in the ISP network 22 for events that are predicted to affect the performance of the streaming and alerts the electronic device 10 to a potential change in performance. It is also possible that the LAN formed by the access point 20 monitors conditions in the LAN and alerts the electronic device 10 to a potential change in performance.

In any of these situations, if the alert indicates that network performance is predicted to degrade, the electronic device 10 may react to the prediction of the change in performance and request steaming of the content at a lower quality level than is currently requested and streamed from the content server 24 to minimize interruption in the consumption of the content. If the alert indicates that performance is predicted to improve, the electronic device 10 may react to the prediction and request streaming of the content at a higher quality level than currently requested and streamed from the content server 24 to be able to consume higher quality content as soon as practically supported by capabilities or capacity of the network 12.

The disclosed techniques are an improved implementation of adaptive streaming. In the disclosed approach, it will be assumed that the content server 24 makes several alternative encoded versions of the same content (e.g., video or other multimedia content) available to the electronic device 10. Each encoded version has a different compression quality. Content that has been downloaded into a media buffer of the electronic device 10 may be played back (also referred to as consumed). In one embodiment, a buffering strategy to achieve low power consumption by the electronic device 10 may be employed. For instance, the streaming may include periods of modem inactivity between buffer refills during which time the modem enters a low power mode (e.g., an idle mode). When the modem of the electronic device 10 is in the low power mode, there may be no active transmission regarding the streaming of the content ongoing between the electronic device 10 and the connected base station 18. However, even at times when the electronic device 10 is not actively downloading content, the electronic device may be listening to paging or other messaging from the network 12. Therefore, in one embodiment, the network 12 initiates a packet switched (PS) paging event (e.g., using L3 paging) or other messaging to inform the electronic device 10 about upcoming variations in the available network capacity. In an embodiment involving paging request, the network operator server 16 may transmit a page, which will immediately activate a modem of the electronic device 10 to receive assistance information. In turn, the assistance information is used by the electronic device 10 to immediately change its buffering strategy, such as by forcing an earlier buffer refill that would ordinarily occur based on the amount of data in the buffer and/or request a different quality of stream.

Figure 2:
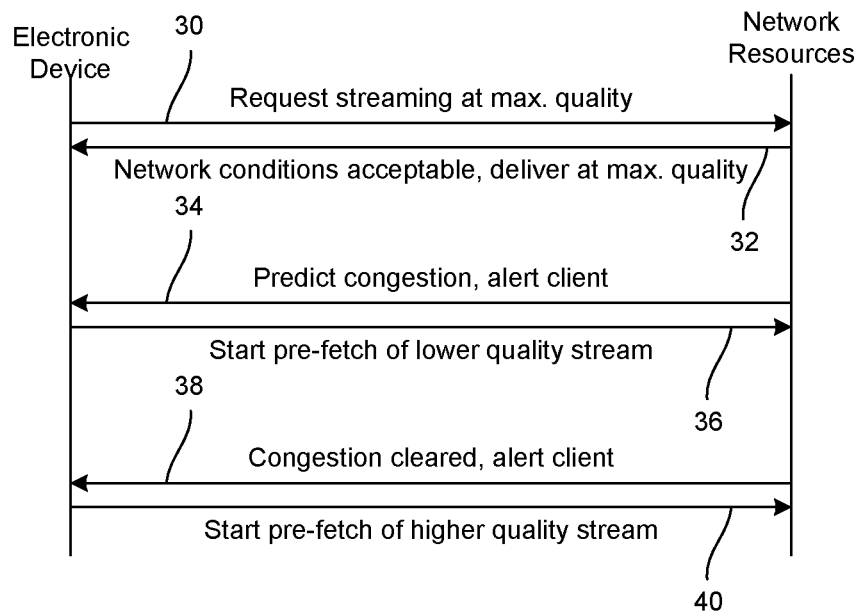
FIG. 2 is a diagram showing communications between the electronic device and network resources during the streaming of content according to aspects of the disclosed techniques.

With additional reference to FIG. 2, shown are communications between the electronic device 10 and network resources during the streaming of content. Depending on each specific communication, the network resource with which the electronic device 10 communicates may be with one or more of the network operator server 16, the content server 24, the ISP network 22 or other item in the communications environment in which the electronic device 10 participates.

At step 30, the electronic device 10 requests streamed content from the content server 24. In many cases, the content server 24 makes the content available at two or more quality levels. Exemplary quality levels for video include 1080p as a highest available quality level, 720p as an intermediate available quality level, and 480p as a lowest available quality level. In one embodiment, the electronic device 10 initially requests content from the content server 24 at the highest available quality level. Assuming that network conditions permit delivery of the content at the highest available quality level, the content sever 24 will stream the content at the requested quality level at step 32. During the streaming, the electronic device 10 downloads content in an incremental manner. That is, content is downloaded from the media server 24 to media buffer of the electronic device 10 during periods of downloading data. Between these periods data is not downloaded. The timing of the intervals in which data is downloaded may be based on an amount of data in the media buffer, may be based on a predetermined timing scheme for the requested quality level or data rate, or based on some other factor or combination of factors.

Figure 3:
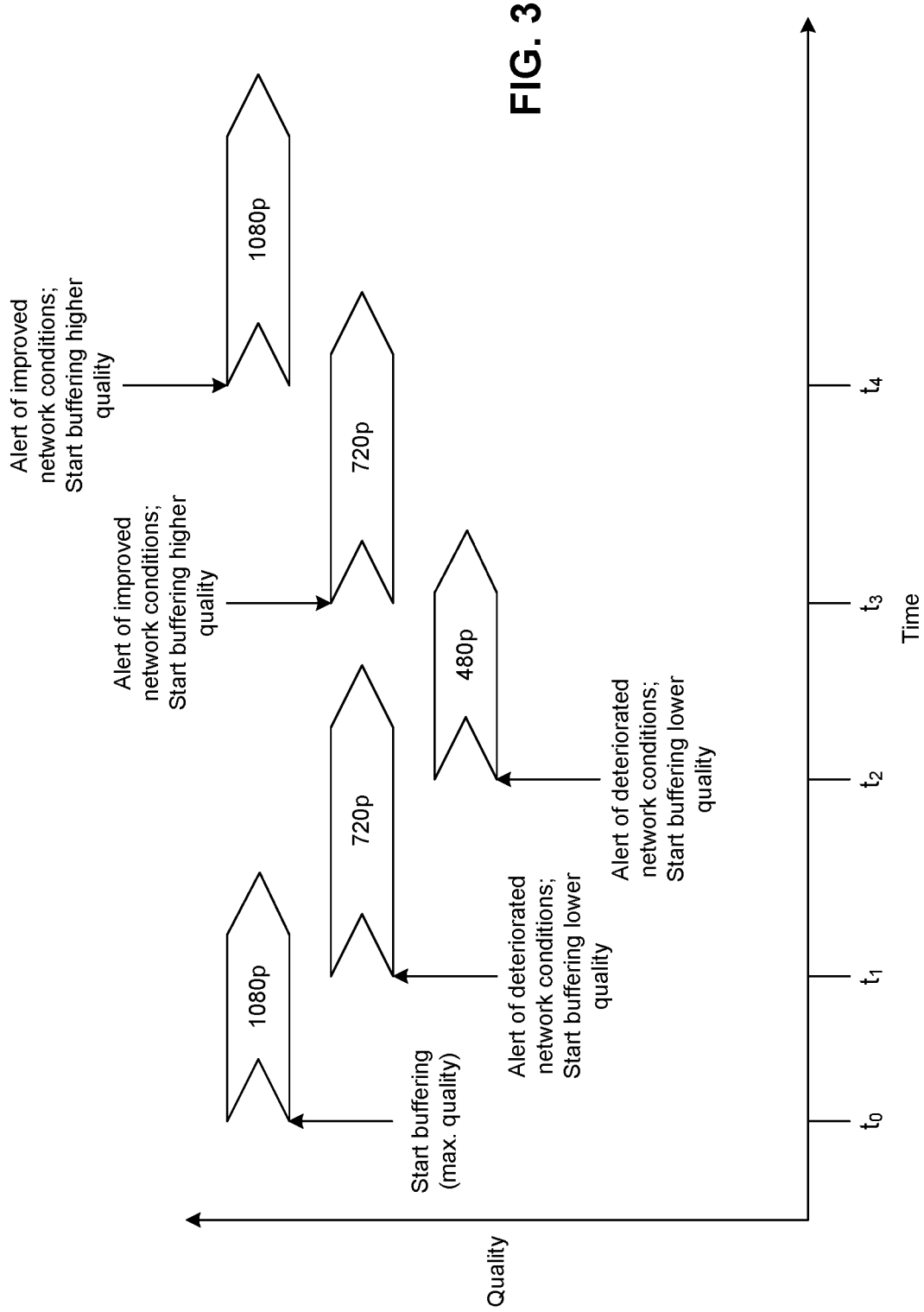
FIG. 3 is an exemplary plot of content quality versus time based on varying network conditions.

With additional reference to FIG. 3, shown is an exemplary plot of content quality that is buffered by the electronic device 10 versus time. The buffer content quality versus time is a function of varying network conditions. For instance, at time to, the content server 24 initiates streaming of the content at the highest available quality level (e.g., 1080p) and the electronic device 10 starts buffering and consuming the content at that quality level.

For purposes of description, it will be assumed that the content is streamed to the electronic device 10 over the subscriber network 12. The following steps are described in this operational context, but it will be appreciated that similar operations may be carried out when the content is streamed over the ISP network 22 and/or a local area network.

Nodes within the radio access subscriber network 12 are capable of determining and, to some extent, predicting network load within portions of the network. For instance, the network 12 maybe capable of predicting an upcoming period of congestion for the base station 18 and/or other network element that services the electronic device 10. The amount of network congestion may be due to a variety of factors, such as other electronic devices moving into an area serviced by the same base station 18 that services the electronic device 10. As those devices are handed off from other base stations 18 to the base station 18 servicing the electronic device 10, the available throughput to the electronic device 10 may degrade. Similarly, as devices are handed off from the base station 18 servicing the electronic device 10 to other base stations 18, the available throughput to the electronic device 10 may improve. Another exemplary situation that may affect throughput is when the electronic device 10 is handed off to another base station 18. In addition to the number of electronic devices serviced by each base station 18, the network 12 may predict congestion based on the activity of the electronic devices 10 serviced by each base station 18 (e.g., how many devices are streaming content, how many devices are engaged in calls, how many devices are browsing the Internet, etc.). In similar manner, the network 12 may predict when congestion will mitigate for an electronic device 10.

In one embodiment, the subscriber network 12 determines the electronics devices that stream content via the subscriber network 12. For each electronic device that streams content via the subscriber network 12, the subscriber network 12 monitors network conditions. For each electronic device, if a prediction is made that the network conditions will degrade or will improve from a degraded state, a notification may be transmitted to the appropriate electronic device.

In step 34, for example, the subscriber network 12 notifies the electronic device of a condition that may negatively affect streaming of the content. As indicated, an exemplary condition that may negatively affect steaming of the content is predicted network congestion. The notification may be in any appropriate format to serve as network assistance data. For example, the notification may be communicated through a paging process, push delivery, or other messaging protocol. The notification may serve as an advisory notification, such as an alert upon which the electronic device 10 may act at the discretion of the electronic device 10. Alternatively, the notification may serve as a network command, such as an alert upon which the electronic device 10 is programmed to take action.

In step 36, receipt of the notification by the electronic device 10 may trigger the electronic device 10 to request streaming of the content at a lower quality or bitrate than currently requested. For example, at time $t_1$ in FIG. 3, the electronic device 10 receives a notification of predicted network congestion and, in response, requests that the content server 24 start to stream the content at a lower quality than current steamed (e.g., request 720p instead of 1080p). Since the electronic device 10 reacts to a notification of predicted network degradation, it is expected that the electronic device 10 will start to buffer content streamed at the lower quality before network conditions degrade and streaming at the higher quality level becomes problematic. Content remaining in the buffer at the higher quality and received in the time from $t_0$ to $t_1$ may be consumed before transitioning to the consumption of content at the lower quality level. This process ought to reduce interruptions in the viewing of video content by a user.

As depicted in FIG. 3, steps 34 and 36 may be repeated if the subscriber network 12 predicts additional degradation in network performance. For example, at time $t_2$ in FIG. 3, the electronic device 10 receives another notification of predicted network congestion and, in response, requests that the content server 24 start to stream the content at a lower quality than current steamed (e.g., request 480p instead of 720p). Since the electronic device 10 reacts to a notification of predicted network degradation, it is expected that the electronic device 10 will start to buffer content streamed at the lower quality before network conditions degrade and streaming at the higher quality level becomes problematic. Content remaining in the buffer at the higher quality and received in the time from $t_1$ to $t_2$ may be consumed before transitioning to the consumption of content at the lower quality level. This process ought to reduce interruptions in the viewing of video content by a user.

In a preferred embodiment, the electronic device 10 requests content at a lower quality immediately upon receipt and processing of the notification. In this embodiment, the notification acts as a trigger to request lower quality content regardless of an amount of time until the congestion is predicted to commence, regardless of how much data is in the buffer, regardless of timing relative to the next buffer refill at the current quality level, and/or regardless of the state of the modem (e.g., in an idle state between buffer refills or actively downloading content).

In another embodiment, the notification of network degradation includes a time at which the degradation is predicted to occur. The time may be specified as an absolute time (e.g., a duration specified in seconds) or as a time value (e.g., an hour, minute and second). In this embodiment, the electronic device 10 may request content at a lower quality when the amount of time until predicted network congestion falls below a predetermined period of time (e.g., the predetermined period of time being in the range of about 5 seconds to about 30 seconds before congestion is predicted to take place). In another embodiment, the electronic device 10 may request content at a lower quality after receipt of the notification and when the amount of data in the buffer falls below a predetermined level.

As indicated, the subscriber network 12 also may monitor network conditions to determine if network conditions for the electronic device 10 are predicted to improve from a degraded state. In step 38, for example, the subscriber network 12 notifies the electronic device 10 of a condition that may positively affect streaming of the content. The notification may be in any appropriate format to serve as network assistance data. For example, the notification may be communicated through a paging process, push delivery, or other messaging protocol. The notification may serve as an advisory notification, such as an alert upon which the electronic device 10 may act at the discretion of the electronic device 10. Alternatively, the notification may serve as a network command, such as an alert upon which the electronic device 10 is programmed to take action.

In step 40, receipt of the notification by the electronic device 10 may trigger the electronic device 10 to request streaming of the content at a higher quality or bitrate than currently requested. For example, at time $t_3$ in FIG. 3, the electronic device 10 receives a notification of predicted network improvement and, in response, requests that the content server 24 start to stream the content at a higher quality than current steamed (e.g., request 720p instead of 480p). Since the electronic device 10 reacts to a notification of predicted network improvement, it is expected that the electronic device 10 will start to buffer content streamed at the higher quality before or at the time that network conditions improve. Content remaining in the buffer at the lower quality and received in the time from $t_2$ to $t_3$ may be consumed before transitioning to the consumption of content at the higher quality level.

As depicted in FIG. 3, steps 38 and 40 may be repeated if the subscriber network 12 predicts additional improvement in network performance. For example, at time $t_4$ in FIG. 3, the electronic device 10 receives another notification of predicted network improvement and, in response, requests that the content server 24 start to stream the content at a higher quality than currently steamed (e.g., request 1080p instead of 720p). Since the electronic device 10 reacts to a notification of predicted network improvement, it is expected that the electronic device 10 will start to buffer content streamed at the higher quality before or at the time that network conditions improve. Content remaining in the buffer at the lower quality and received in the time from $t_3$ to $t_4$ may be consumed before transitioning to the consumption of content at the higher quality level.

In one embodiment, however, the electronic device 10 may request content at a higher quality immediately upon receipt and processing of the notification. In this embodiment, the notification acts as a trigger to request higher quality content regardless of an amount of time until the congestion is predicted to mitigate, regardless of how much data is in the buffer, regardless of timing relative to the next buffer refill at the current quality level, and/or regardless of the state of the modem (e.g., in an idle state between buffer refills or actively downloading content). In this embodiment, it is possible that the network 12 may control when to send the notification to coordinate streaming activity of the electronic device 10 with network congestion. This may reduce the likelihood that the electronic device 10 will request higher quality content before network conditions actually improve.

In another embodiment, the notification of network improvement includes a time at which the improvement in network conditions is predicted to occur. The time may be specified as an absolute time (e.g., a duration specified in seconds) or as a time value (e.g., an hour, minute and second). In this embodiment, the electronic device 10 may request content at a higher quality when the amount of time until predicted network congestion falls below a predetermined period of time (e.g., the predetermined period of time being in the range of about zero seconds to about 10 seconds before improvement is predicted to take place). A predetermined amount of time of zero seconds may be used to ensure that the electronic device 10 does not start streaming content at a higher quality until arrival of the time that the network has predicted that the network conditions will have improved.

In one embodiment, the notification of network degradation and/or the notification of network improvement may contain an indication of an appropriate content quality level for the electronic device 10 to request from the content server 24. Providing this information in the notification may assist in network management by the network 12. In other embodiments, the content quality level for the electronic device 10 to request is determined by the electronic device 10.

The illustration of FIG. 3 shows the content quality stepping down and stepping back up from one quality level to the next. In the case where the content is video, stepping the content through multiple levels allows for less noticeable transitions among quality levels to the user during viewing of the streamed video content. In other embodiments or for large and sudden changes in predicted network performance, the control over content streaming may be implemented to skip a quality level. In this case, the electronic device 10 may be supplied with a notification containing adequate information about predicted network performance to make a determination that a quality level should be skipped. For example, the notification may contain indication of amount of degradation and, if the amount of degradation exceeds a predetermined threshold, the electronic device may request that content is streamed at a quality level lower than the next available lower quality level relative to the currently requested quality level.

In this disclosure, adaptive streaming is implemented by requesting different quality levels in conjunction with changing the timing at which data is downloaded. It will be appreciated that other approaches may be used. For instance, changes to the requested bit rate or changes to a combination of the quality and bit rate may be made in response to notifications of network degradation or improvement in the same manners as described above for changing the requested content quality.

Under the disclosed techniques, the electronic device 10 is quickly informed of and may quickly react to unexpected variations in the performance of the network through which streaming content is received (e.g., the radio access network 12, the ISP network 22 or LAN). Adjustments to the streaming operation may be made even if the electronic device 10 is in an idle mode during which time the electronic device 10 draws data from a media buffer to consume the streamed content and is not actively receiving content data. In one embodiment, this is accomplished using a packet switched paging event initiated by the network to wake up communications of the electronic device 10 to receive assistance information and react to the assistance information (e.g., change a buffering strategy by forcing an early buffer refill and/or requesting content at a different quality level).

Since the electronic device 10 uses information from the network 12 to "pre-fetch" (also referred to as "pre-load") content data before a time at which a buffer refill would normally be made had there been no changes in network conditions or the requested quality level, the user will benefit from a more seamless presentation of the content. Another advantage is that the user will not experience sudden changes (e.g., drops or increases) in the quality of the content. For instance, the network may guide the electronic device 10 to either decrease or increase quality in an incremental fashion to slowly degrade or improve the quality of the streamed content. Still another advantage is more control over network resources by the network 12 and less loading on the network 12, which allows the network 12 to deliver higher aggregate quality of service to many devices.

Figure 4:
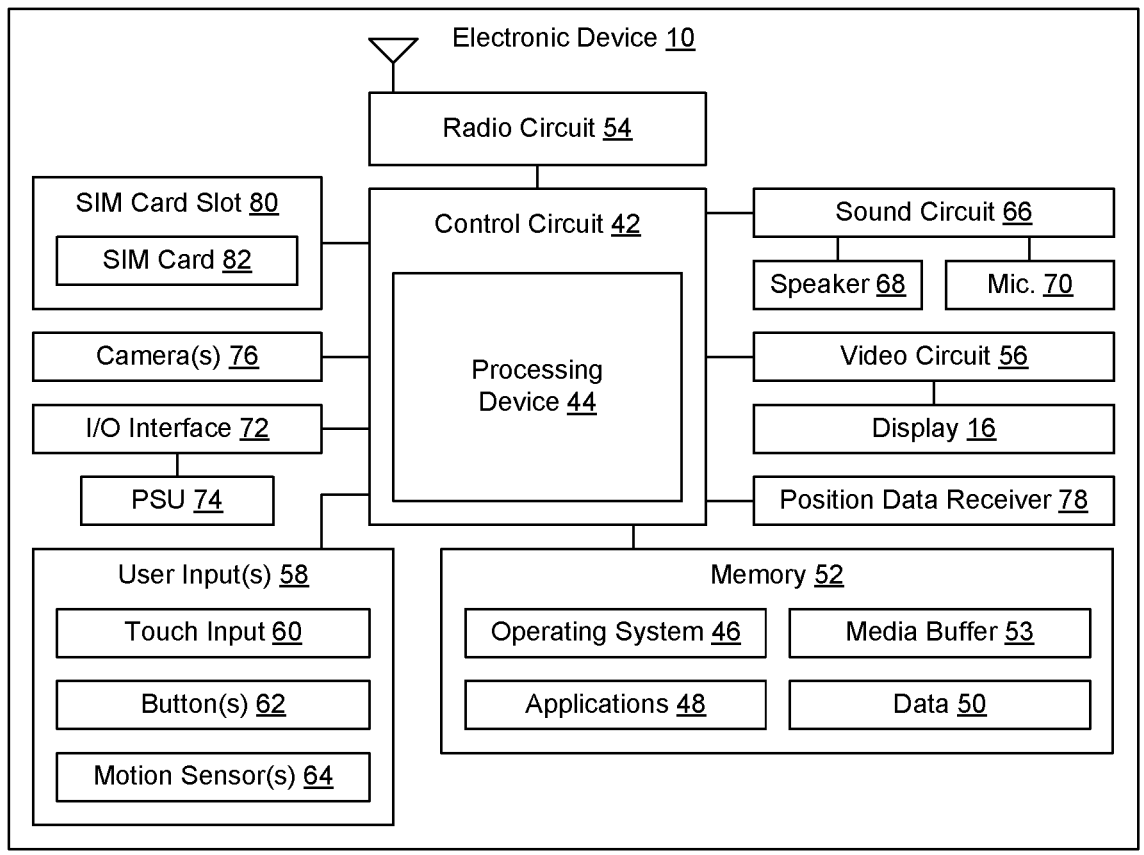
FIG. 4 is a schematic block diagram of the electronic device.

With additional reference to FIG. 4, a schematic block diagram of the electronic device 10 in its exemplary form as a mobile telephone is illustrated. The electronic device 10 includes a control circuit 42 that is responsible for overall operation of the electronic device 10, including controlling content streaming. The control circuit 42 includes a processor 44 that executes an operating system 46 and various applications 48. Typically, control over the content streaming protocol of the electronic device 10 is embodied as part of the operating system 46. In other embodiments, this functionality may be embodied as a dedicated application.

The operating system 46, the applications 48, and stored data 50 (e.g., data associated with the operating system 46, the applications 48, and user files), are stored on a memory 52. The operating system 46 and applications 48 are embodied in the form of executable logic routines (e.g., lines of code, software programs, etc.) that are stored on a non-transitory computer readable medium (e.g., the memory 52) of the electronic device 10 and are executed by the control circuit 42. The described operations may be thought of as a method that is carried out by the electronic device 10.

The processor 44 of the control circuit 42 may be a central processing unit (CPU), microcontroller, or microprocessor. The processor 44 executes code stored in a memory (not shown) within the control circuit 42 and/or in a separate memory, such as the memory 52, in order to carry out operation of the electronic device 10. The memory 52 may be, for example, one or more of a buffer, a flash memory, a hard drive, a removable media, a volatile memory, a non-volatile memory, a random access memory (RAM), or other suitable device. In a typical arrangement, the memory 52 includes a non-volatile memory for long term data storage and a volatile memory that functions as system memory for the control circuit 42. In addition, the memory 52 may include a media buffer 53 in which streamed content is temporarily stored before consumption. The memory 52 may exchange data with the control circuit 42 over a data bus. Accompanying control lines and an address bus between the memory 52 and the control circuit 42 also may be present. The memory 52 is considered a non-transitory computer readable medium.

The electronic device 10 includes communications circuitry that enables the electronic device 10 to establish various wireless communication connections. In the exemplary embodiment, the communications circuitry includes a radio circuit 54 (sometimes referred to as a modem). The radio circuit 54 includes one or more radio frequency transceivers and an antenna assembly (or assemblies). In the case that the electronic device 10 is a multi-mode device capable of communicating using more than one standard and/or over more than one radio frequency band, the radio circuit 54 represents one or more than one radio transceiver, one or more than one antenna, tuners, impedance matching circuits, and any other components needed for the various supported frequency bands and radio access technologies. The radio circuit 54 further represents any radio transceivers and antennas used for local wireless communications directly with another electronic device, such as over a Bluetooth interface.

The electronic device 10 further includes the display 16 for displaying information to a user. The display 16 may be coupled to the control circuit 42 by a video circuit 56 that converts video data to a video signal used to drive the display 16. The video circuit 56 may include any appropriate buffers, decoders, video data processors and so forth.

The electronic device 10 may include one or more user inputs 58 for receiving user input for controlling operation of the electronic device 10. Exemplary user inputs include, but are not limited to, a touch input 60 that overlays or is part of the display 16 for touch screen functionality, one or more buttons 62, motion sensors 64 (e.g., gyro sensors, accelerometers), and so forth.

The electronic device 10 may further include a sound circuit 66 for processing audio signals. Coupled to the sound circuit 66 are a speaker 68 and a microphone 70 that enable audio operations that are carried out with the electronic device 10 (e.g., conduct telephone calls, output sound, capture audio for videos, etc.). The sound circuit 66 may include any appropriate buffers, encoders, decoders, amplifiers and so forth.

The electronic device 10 may further include one or more input/output (I/O) interface(s) 72. The I/O interface(s) 72 may be in the form of typical electronic device I/O interfaces and may include one or more electrical connectors for operatively connecting the electronic device 10 to another device (e.g., a computer) or an accessory (e.g., a personal handsfree (PHF) device) via a cable. Further, operating power may be received over the I/O interface(s) 72 and power to charge a battery of a power supply unit (PSU) 74 within the electronic device 10 may be received over the I/O interface(s) 72. The PSU 74 may supply power to operate the electronic device 10 in the absence of an external power source.

The electronic device 10 also may include various other components. As an example, one or more cameras 76 may be present for taking photographs or video, or for use in video telephony. As another example, a position data receiver 78, such as a global positioning system (GPS) receiver, may be present to assist in determining the location of the electronic device 10. The electronic device 10 also may include a subscriber identity module (SIM) card slot 80 in which a SIM card 82 is received. The slot 80 includes any appropriate connectors and interface hardware to establish an operative connection between the electronic device 10 and the SIM card 82.

Although certain embodiments have been shown and described, it is understood that equivalents and modifications falling within the scope of the appended claims will occur to others who are skilled in the art upon the reading and understanding of this specification.

What is claimed is:

1. A method of streaming content with an electronic device having communication circuitry, comprising:
   incrementally downloading content data at a first quality level from a content server over a network;
   receiving, via the communication circuitry, a notification indicative of predicted future network congestion; and
   in response to receipt of the notification, requesting and downloading a next increment of the content data from the content server such that the next increment of the content data is performed before a next download increment at the first quality level would have started absent receipt of the notification.

2. The method of claim 1, wherein the incremental downloading includes periods during which the content data is downloaded interleaved with periods during which the content data is not downloaded.

3. The method of claim 1, wherein the requesting and downloading the next increment of the content data is at a second quality level lower than the first quality level.

4. The method of claim 3, further comprising:
   receiving an additional notification indicative of additional predicted future network congestion; and
   requesting and downloading a next increment of the content data at a third quality level lower than the second quality level from the content server, the requesting and downloading the next increment of the content data at the third quality level triggered by the receipt of the additional notification.

5. The method of claim 3, further comprising:
   receiving a notification indicative of network improvement or predicted network improvement; and
   requesting and downloading a next increment of the content data at the first quality level, the requesting and downloading of the next increment of the content data at the first quality level triggered by the receipt of the notification of network improvement or predicted network improvement.

6. The method of claim 1, wherein receiving the notification comprises a paging event from the network.

7. An electronic device configured to stream content from a content server over a network, comprising:
   a communications circuit over which communications with the content server are made via the network;
   a media buffer; and
   a control circuit that, in conjunction with the communications circuit:
   incrementally downloads content data at a first quality level from the content server to the media buffer;
   receives a notification indicative of predicted future network congestion; and
   in response to receipt of the notification, requests and downloads a next increment of the content data from the content server such that the next increment of the content data is performed before a next download increment at the first quality level would have started absent receipt of the notification.

8. The electronic device of claim 7, wherein the incremental download of the content data includes periods during which the content data is downloaded interleaved with periods during which the content data is not downloaded.

9. The electronic device of claim 7, wherein the request and download of the next increment of the content data is at a second quality level lower than the first quality level.

10. The electronic device of claim 9, wherein the control circuit further;
- receives an additional notification indicative of additional predicted future network congestion; and
- requests and downloads a next increment of the content data at a third quality level lower than the second quality level from the content server, the request for and download of the next increment of the content data at the third quality level triggered by the receipt of the additional notification.

11. The electronic device of claim 9, wherein the control circuit further;
- receives a notification indicative of network improvement or predicted network improvement; and
- requests and downloads a next increment of the content data at the first quality level, the request for and download of the next increment of the content data at the first quality level triggered by the receipt of the notification of network improvement or predicted network improvement.

12. The electronic device of claim 7, wherein receipt of the notification comprises receipt of a paging event from the network.

\* \* \* \* \*